(12) United States Patent
Seo (10) Patent No.: US 8,248,662 B2
(45) Date of Patent: Aug. 21, 2012

(54) IMAGE FORMING APPARATUS AND METHOD THEREOF

(75) Inventor: Hyeon-seok Seo, Incheon (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1076 days.

(21) Appl. No.: 11/942,906

(22) Filed: Nov. 20, 2007

(65) Prior Publication Data

US 2008/0278762 A1 Nov. 13, 2008

(30) Foreign Application Priority Data

May 11, 2007 (KR) .................. 10-2007-0046145

(51) Int. Cl.
*G06K 15/00* (2006.01)
*H04N 1/405* (2006.01)

(52) U.S. Cl. ........ 358/3.06; 358/1.9; 358/2.1; 358/3.26; 358/3.27; 382/173; 382/176; 382/199; 382/224; 382/263; 382/266; 382/269; 345/596; 345/611

(58) Field of Classification Search .................. None
See application file for complete search history.

(56) References Cited

U.S. PATENT DOCUMENTS

| | | | |
|---|---|---|---|
| 6,285,801 B1 | 9/2001 | Mancuso et al. | |
| 6,600,839 B2 | 7/2003 | Mancuso et al. | |
| 7,155,067 B2 | 12/2006 | Jayant et al. | |
| 7,391,920 B2 * | 6/2008 | Abe | 382/266 |
| 2001/0031097 A1 | 10/2001 | Mancuso et al. | |
| 2003/0202193 A1 * | 10/2003 | Yokochi | 358/1.9 |
| 2005/0041871 A1 * | 2/2005 | Abe | 382/199 |
| 2007/0065036 A1 * | 3/2007 | Chen | 382/266 |
| 2007/0146386 A1 * | 6/2007 | Loce et al. | 345/611 |
| 2007/0236707 A1 * | 10/2007 | Shoda | 358/1.2 |
| 2008/0123141 A1 * | 5/2008 | Noguchi | 358/2.1 |

FOREIGN PATENT DOCUMENTS

| | | |
|---|---|---|
| EP | 1 067 774 A2 | 1/2001 |
| JP | 2000-32465 | 1/2000 |
| JP | 2000-101871 | 4/2000 |
| JP | 2001-8037 | 1/2001 |
| KR | 2006-0064487 | 6/2006 |

OTHER PUBLICATIONS

Korean Office Action issued Feb. 27, 2012 in corresponding Korean Patent Application 10-2007-0115107.

* cited by examiner

*Primary Examiner* — Marivelisse Santiago Cordero
*Assistant Examiner* — Miya J Cato
(74) *Attorney, Agent, or Firm* — Staas & Halsey LLP (57) ABSTRACT

An image forming apparatus and a method of using the same, the image forming apparatus including: a detection unit to detect an edge of an input image; a categorization unit to categorize the detected edge, according to a gray value and line width; and a compensation unit to compensate the gray value according to the categorized edge type.

18 Claims, 5 Drawing Sheets

IMAGE FORMING APPARATUS AND METHOD THEREOF

CROSS-REFERENCE TO RELATED APPLICATION

This application claims the benefit of Korean Application No. 2007-46145, filed May 11, 2007, in the Korean Intellectual Property Office, the disclosure of which is incorporated herein by reference.

BACKGROUND OF THE INVENTION

1. Field of the Invention

Aspects of the present invention relate to an image forming apparatus and method thereof.

2. Description of the Related Art

Generally, an image forming apparatus, such as a laser printer, performs a halftone process for each pixel representing an image when displaying a gray scale image in monochrome. The halftone process is a method for representing a gray scale image, by adjusting the number of dots constituting the pixels. For example, if the number of black dots is from 0 to 255, a image can be produced having 256 different gray values.

If an image forming apparatus enhances the quality or characteristics of the halftone-processed image, edges of the image can be blurred. An 'edge' is a boundary area between pixels of an image, for example, a discontinuous line of a gray level pattern.

There are methods to correct blurring edges. In one such method, for example, an edge is detected after applying a binary system to an input image, and an edge map is drawn. A gray value of an area in which an edge exists, is changed using the edge map. A diffused gray value is compensated by changing the gray value. Alternatively, a line width is increased when the brightness of a line of an input image exceeds a threshold value, and when the line width is less than a threshold value.

However, the above methods have various problems. For example, when edges are detected after applying a binary system to an image, edges exceeding a certain brightness may not be detected, because a compensating position and/or a gray value of the undetected edge may differ from a detection position of the input image. In addition, the gray value and the shape of the edge are changed between input and output of the image. Furthermore, an edge is not compensated when a negative hairline of an image is exclusively considered. Accordingly, these methods may not improve resolution of an image.

SUMMARY OF THE INVENTION

Aspects of the present invention relate to an image forming apparatus to improve a resolution of an image, and a method thereof.

Additional aspects and/or advantages of the invention will be set forth in part in the description which follows, and in part, will be obvious from the description, or may be learned by practice of the invention.

According to aspects of the present invention, there is provided an image forming apparatus comprising an image processing device to compensate at least one of a gray value and a line width of an edge, according to the edge type forming an input image.

The image processing device may comprise a detection unit to detect an edge of an input image; a categorization unit to categorize the edge into an edge type, according to a gray value and a line width associated with the edge; and a compensation unit to compensate at least one of the gray value and the line width, according to the categorized edge type.

The image may comprise text and/or a hairline.

The image may be formed of pixels, and the detection unit may sequentially set each of the pixels as a center pixel, and determine whether the center pixel is included in an edge by comparing a sum of gray value differences between the center pixel and adjacent ones of the pixels with a predetermined gray threshold value.

If the sum is positive, the categorization unit may categorize the edge as a rising edge, and if the sum is negative, the categorization unit may categorize the edge as a falling edge.

If the line width of the rising edge is less than a predetermined line width threshold value, the categorization unit may categorize the rising edge as a negative hairline, and if the line width of the falling edge is less than the predetermined line width threshold value, the categorization unit may categorize the falling edge as a positive hairline.

If the edge is a rising edge, the compensation unit may increase a gray value of the rising edge; if the edge is a falling edge, the compensation unit may decrease a gray value of the falling edge; if the edge is a positive hairline, the compensation unit may decrease a gray value of the positive hairline; and if the edge is a negative hairline, the compensation unit may increase a gray value and a line width of the negative hairline.

The compensation unit may compensate the edge based on a lookup table comprising gray value compensation amounts corresponding to the categorized edge type.

The detection unit may comprise a high-pass filter to filter an area of the image.

The high-pass filter may comprise a Canny filter or a Sobel filter.

The detection unit may comprise a high-pass filter to filter an area of the image, multiply a weighting factor of the high-pass filter by the gray value differences, and add the multiplied differences to produce the sum.

The compensation unit may increase a gray value of one of the pixels that is adjacent to one of the pixels associated with the negative hairline, to compensate the line width of the edge.

The compensation unit may increase a difference in gray values of adjacent ones of the pixels associated with the edge, to compensate the gray value of the edge.

According to aspects of the present invention, there is provided an image forming method, comprising: detecting an edge of an input image; categorizing the edge into an edge type, according to a gray value and a line width of the edge; and compensating at least one of the gray value and the line width of the edge, according to the categorized edge type.

The image may comprise text and/or a hairline.

The image may be formed of pixels, and the detecting of the edge may sequentially comprise setting each of the pixels as a center pixel; and comparing a sum of gray value differences between the center pixel and adjacent ones of the pixels with a predetermined gray threshold value.

The categorizing of the edge may comprise categorizing the edge as a rising edge, if the sum is positive; and categorizing the edge as a falling edge, if the sum is negative.

The categorizing of the edge may comprise categorizing the rising edge as a negative hairline, if the line width of the rising edge is less than a predetermined line width threshold value; and categorizing the falling edge as a positive hairline, if the line width of the falling edge is less than the predetermined line width threshold value.

If the edge is a rising edge, the compensating may increase a gray value of the rising edge. If the edge is a falling edge, the compensating may decrease a gray value of the falling edge. If the edge is a positive hairline, the compensating may decrease a gray value of the positive hairline. If the edge is a negative hairline, the compensating may increase a gray value and a line width of the negative hairline.

The compensating may comprise compensating the gray value based on a lookup table comprising gray value compensation amounts corresponding to the categorized edge type.

The detecting may comprise filtering an area of the image.

The compensating may comprise increasing a difference in gray values of adjacent ones of the pixels associated with the edge.

The compensating may comprise increasing a gray value of one of the pixels that is adjacent to one of the pixels associated with the negative hairline, to compensate the line width of the edge.

The compensating may further comprise increases a difference in gray values of adjacent ones of the pixels associated with the negative hair line, to compensate the gray value of the edge.

The detecting may further comprise multiplying a weighting factor of a high-pass filter by the gray value differences, and adding the multiplied differences to produce the sum.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Reference will now be made in detail to the exemplary embodiments of the present invention, examples of which are illustrated in the accompanying drawings, wherein like reference numerals refer to the like elements throughout. The embodiments are described below, in order to explain the present invention by referring to the figures.

Figure 1:
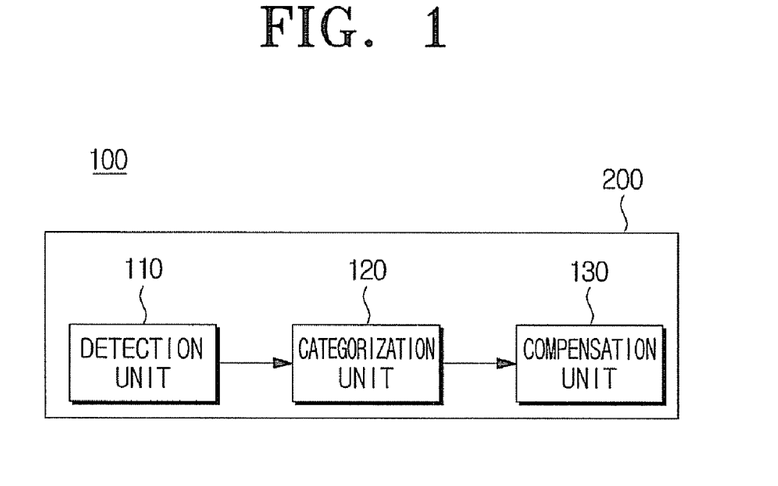
FIG. 1 is a block diagram illustrating structure of an image forming apparatus, according to an exemplary embodiment of the present invention.

FIG. 1 is a block diagram illustrating a structure of an image forming apparatus 100, according to an exemplary embodiment of the present invention. Referring to FIG. 1, the image forming apparatus 100 comprises a detection unit 110, a categorization unit 120, and a compensation unit 130. The detection unit 110, categorization unit 120, and compensation unit 130 may be embodied in a single image processing device 200. The image forming apparatus 100 may enhance an image, for example, by increasing a resolution of an image. The image can include a picture, text, and/or a hairline. The image forming apparatus can highlight an edge of an image such as a picture.

The image forming apparatus 100 is applicable to a host device, such as, a personal computer, a notebook computer, or an image forming apparatus, such as, a printer, a multi-functional unit, or a scanner.

The detection unit 110 detects an edge of an input gray scale image. As referred to herein, an edge is an area in the image where a discontinuity of a gray value exists, i.e., an area comprising two areas having substantially different gray values. More particularly, an edge can include two or more adjacent pixels having different gray values. An edge is detected by computing a difference of gray values between adjacent pixels surrounding a certain selected pixel (center pixel). Gray values can be measured in terms of pixel luminance and chrominance. The detection unit 110 calculates a sum of maximum/minimum gray value differences in horizontal and vertical directions from a center pixel of the input grayscale image, and compares the sum with a gray threshold value (TH_EDGE), to detect the edge. The gray values of the horizontal and vertical directions are generally computed in four directions, on the basis of the central pixel (m, n), by Formula 1:

$$dx1=\ln(m,n)-\ln(m,n-1),\ dx2=\ln(m,n)-\ln(m,n+1)$$

$$dy1=\ln(m,n)-\ln(m-1,n),\ dy2=\ln(m,n)-\ln(m+1,n) \quad \text{[Formula 1]}$$

In Formula 1, "x" represents an X direction (vertical direction), and "y" represents a Y direction (horizontal direction). The gray values can be computed in any suitable direction, for example, between the center pixel and diagonally adjacent pixels.

The gray threshold value (TH_EDGE) may be set to, for example, 128, which is a central value of gray values ranging from 0~255. The gray threshold value may be set to 64, for example. The gray threshold value may be modified, according to a particular application, and it is not limited to the above examples.

The detection unit 110 filters an area of an input image using a high-pass filter, and a pixel having a maximum filtering value may be determined to be an edge. The high-pass filter may be a Canny filter, or a Sobel filter. That is, the detection unit 110 multiplies a weighting factor related to a size of a block of pixels filtered by a high-pass filter, for example, a 3×3 block, or a 5×5 block, by a pixel-related value of the input image. For example, the detection unit 110 multiplies the weighting factor of the high-pass filter, by the gray value differences between adjacent pixels of image data, and sums the multiplied values.

The detection unit 110 computes an absolute value of the multiplied values. These computations are repeated after moving by one pixel in an X direction and/or one pixel in a Y direction. An edge is detected by observing a change of the absolute value. For example, an area in which the absolute value rapidly increases is an edge.

The categorization unit 120 categorizes the detected edges, according to a gray value and a line width. That is, the categorization unit 120 may categorize the edges as rising edges or as falling edges, according to whether a sum of the differences of the gray values of the pixels of the detected edge is positive or negative. For example, if the sum of the differences of the gray values of the edge (diff_sum) is positive, the edge is classified as a rising edge. If the sum of the differences of the gray values of the edge (diff_sum) is negative, the edge is classified as a falling edge.

The sum of the differences of the gray values of the edge (diff_sum) is computed using the following equation:

$$\text{diff\_sum} = dx1 + dx2 + dy1 + dy2$$

The term 'sum' refers to the sum of differences of gray values in the horizontal and vertical directions.

The categorization unit 120 may categorize the falling edges and the rising edges as positive hairlines or as negative hairlines, respectively, according to a comparison with a threshold value (TH_WIDTH) of a predetermined line width, which is described in detail below, with reference to FIG. 2.

Figure 2:
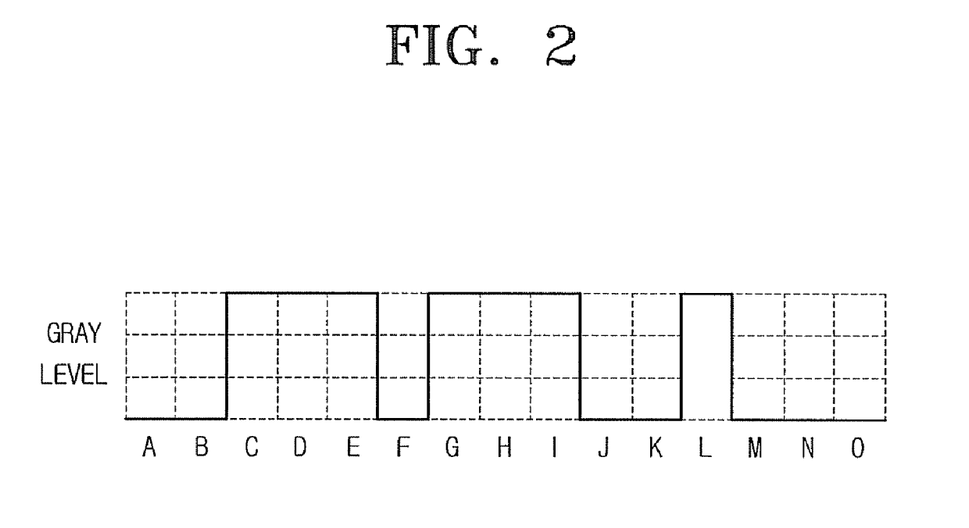
FIG. 2 is a schematic diagram illustrating edge types categorized according to an exemplary embodiment of the present invention.

FIG. 2 is a schematic diagram illustrating the categorization of edge types, according to an exemplary embodiment of the present invention. Referring to FIG. 2, the edge types are determined according to an assumption that the threshold value (TH_WIDTH) of the predetermined line width is 1. The vertical axis indicates a gray value (image intensity) and the horizontal axis indicates pixel IDs for pixels A-O.

Pixel B has a lower gray value than pixel C and the same gray value as pixel A, indicating a rising edge between pixel B and pixel C. Pixel C has the same gray value as pixel D, and pixel B has the same gray value as pixel A, indicating that pixels B and C do not make up a hairline. Pixel J has a lower gray value than pixel I and the same gray value as pixel K, indicating a falling edge between pixel I and pixel J. Pixel J has the same gray value as pixel K, and pixel I has the same gray value as pixel H, indicating that pixels I and J do not make up a hairline.

Pixel F has a lower gray value than adjacent pixels E and G indicating pixel F is part of a positive hairline. A positive hairline is a darker, thin line on a lighter background. Pixel L has a higher gray value than adjacent pixels K and M, indicating pixel L is part of a negative hairline. A negative hairline is a lighter thin line on a darker background. A line width of a positive hairline may be increased by a dot gain effect. A line width of a negative hairline may be decreased by the dot gain effect.

Referring to FIG. 1, the compensation unit 130 compensates the gray value of one or more pixels included in an edge, according to the categorized type of edge. That is, the compensation unit 130 may increase or decrease the gray value of one or more pixels, according to a type of edge formed by the pixels. The compensation unit 130 can alternately adjust the gray values of adjacent pixels included in an edge, to further define an edge. For example, the compensation unit can increase a difference in gray values between adjacent pixels of an edge.

If the categorized edge is a rising edge, the compensation unit 130 increases the gray value of the edge. If the categorized edge is a falling edge, the compensation unit 130 decreases the gray value of the edge. If the categorized edge is a positive hairline, the compensation unit 130 decreases the gray value of the pixel. If the categorized edge is a negative hairline, the compensation unit 130 increases the gray value of the pixel, and increases the gray value of an adjacent pixel, to thereby increase the line width of the negative hairline.

The compensation unit 130 may compensate a pixel forming an edge, based on a lookup table. The lookup table can include different gray value compensation amounts according to the categorized edges. This will be explained below in detail with reference to FIG. 3.

Figure 3:
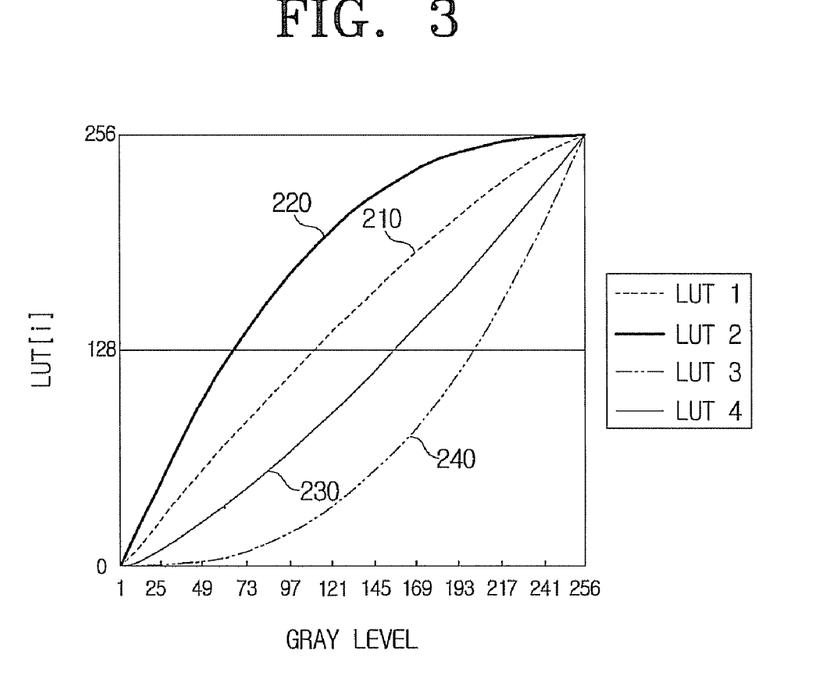
FIG. 3 is a graph illustrating a gray-value lookup table according to edge type, according to an exemplary embodiment of the present invention.

FIG. 3 is a graph illustrating a gray value of lookup table of compensation values to be applied according to types of edges, according to an exemplary embodiment of the present invention. The compensation values can be used to adjust the relative gray levels of one or more pixels of an edge. Referring to FIG. 3, if the categorized edge is a rising edge, a compensation value is determined using line 220 (LUT 2), to brighten the image by increasing the gray value. If the categorized edge is a failing edge, a compensation value is determined using line 240 (LUT 3), to darken the image by decreasing the gray value. If the categorized edge is a positive hairline, a compensation value is determined using line 230 (LUT 4) to decrease the gray value of a pixel. If the categorized edge is a negative hairline, the gray value of a pixel is increased according to a compensation value from line 210 (LUT 1).

If the edge is a negative hairline, in consideration of the dot gain effect, the line width of the negative hairline may be increased. The lookup tables may be provided corresponding to the edge types, and the gray value recorded in the lookup table may be modified according to a plan of a designer. Accordingly, the number lines, and the gray values are not limited thereto.

Figure 4:
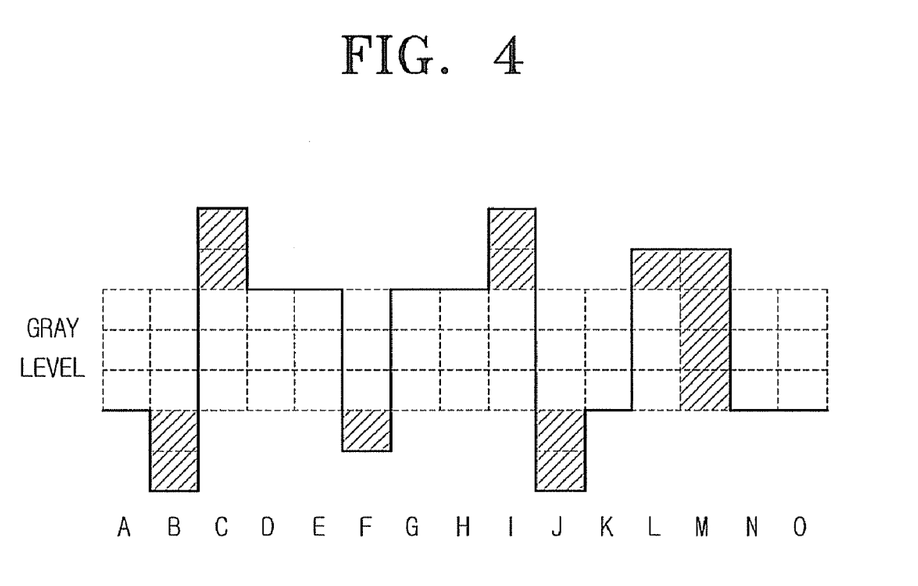
FIG. 4 is a graph illustrating gray values compensated according to edge type, according to an exemplary embodiment of the present invention.

FIG. 4 is a graph illustrating pixels A-O of FIG. 2, after the gray values of various pixels A-O, which make up edges or hairlines are compensated, according to an exemplary embodiment of the present invention. Referring to FIG. 4, a rising edge between pixels B and C has been compensated for, by decreasing the gray value of pixel B by two gray value units (shown as blocks) and by increasing the gray value of pixel C by two units.

The gray value of pixel F, which represents a positive hairline, has been compensated by decreasing the gray value of pixel F by one gray value unit. When compensating pixels of a positive hairline, adjacent pixels are generally not compensated. For example, the gray values of pixels E and G, which are adjacent to pixel F, are not compensated.

The gray value of pixel L, which is included in a negative hairline, is increased by one unit. The width of the negative hairline is compensated by increasing the gray value of pixel M to match the gray value of pixel L, thereby increasing the width of the negative hairline.

Figure 5A:
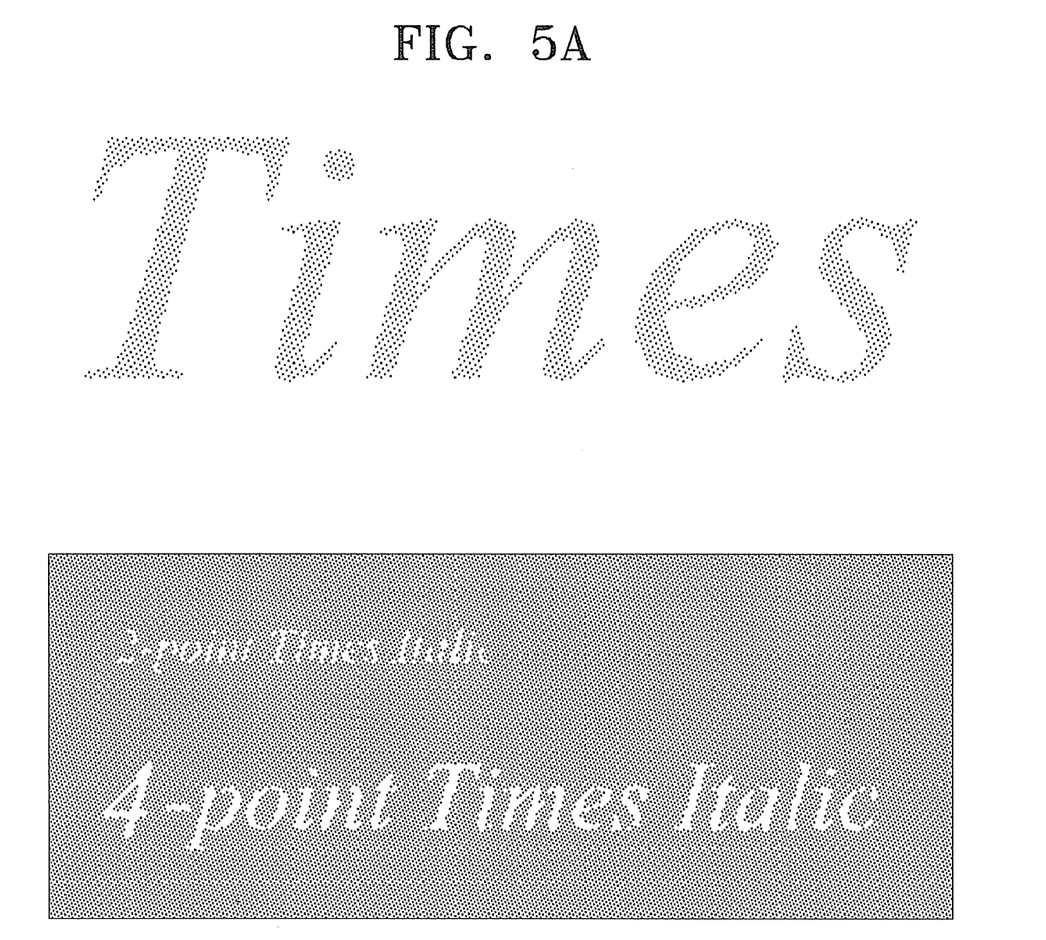
FIGS. 5A and 5B are schematic diagrams illustrating a compensated image, according to an exemplary embodiment of the present invention.
Figure 5B:
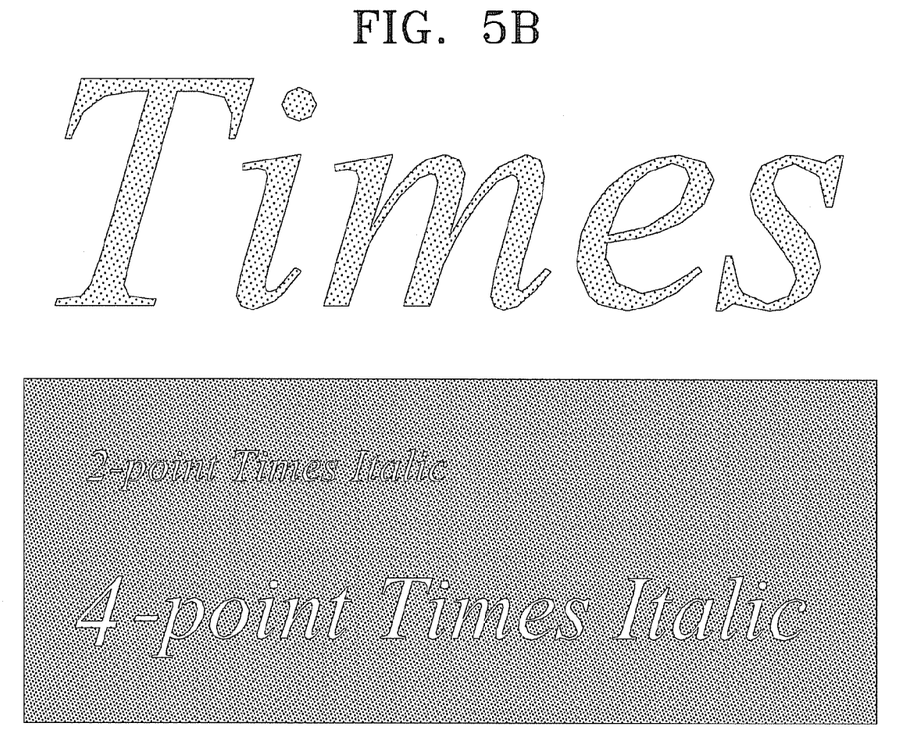

FIG. 5A illustrates images before performing an image enhancement, and FIG. 5B illustrates the images after applying to an image enhancement process, according to an exemplary embodiment of the present invention. Referring to FIG. 5A, outline of the text in the images is unclear. Referring to FIG. 5B, edges of the text in the images are categorized, and gray values of the pixels making up the edges are compensated by varying amounts, according to the categorized edge types. The compensation results in increased contrast at the edges of the text. Accordingly, the text may be represented in high resolution.

Figure 6:
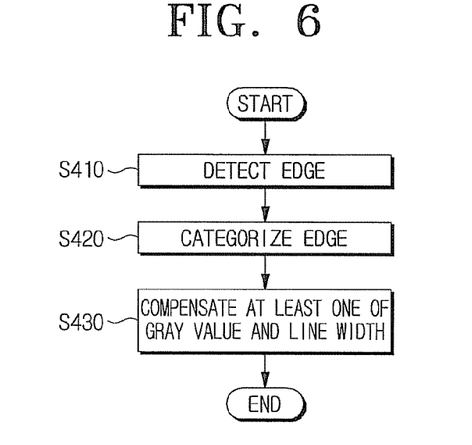
FIG. 6 is a flowchart illustrating an image forming method, according to an exemplary embodiment of the present invention.

FIG. 6 is a flowchart illustrating an image forming method, according to an exemplary embodiment of the present invention. Referring to FIG. 6, if a gray scale image is input, an edge of the input gray scale image is detected (S410). That is, the detection unit 110 compares a sum of differences between maximum/minimum gray values of a selected pixel (center pixel) and adjacent pixels, with a predetermined gray threshold value (TH_EDGE), to determine whether the selected pixel is included in an edge. The adjacent pixels can be, for example, horizontally adjacent, vertically adjacent, or diagonally adjacent to the selected pixel. The determination as to whether a pixel is included in an edge can also be performed using other known techniques.

A detected edge is categorized according to a gray value and line width of the detected edge (S420). For example, if a sum of the differences of gray values of the detected edge (diff_sum) is positive, the edge is categorized as a rising edge, and if a sum of the differences of gray values of the detected edge (diff_sum) is negative, the edge is categorized as a falling edge. If a line width of the detected edge is less than the predetermined line width threshold value (TH_EDGE), the edge may be categorized as a positive hairline or a negative hairline.

At least one of a gray value and a line width of a categorized edge is compensated, according to the categorized edge type (S430). For example, if the categorized edge is a rising edge, a gray value of a pixel included in the edge is increased, and if the categorized edge is a falling edge, a gray value of a pixel included in the edge is decreased. If the categorized edge is a positive hairline, a gray value of a pixel included in the edge is decreased. If the categorized edge is a negative hairline, a gray value of a pixel included in the hairline is increased and a line width of the edge is increased by increasing the gray value of an adjacent pixel.

If an edge is a positive hairline, a gray value of pixels adjacent to the pixel included in the positive hairline may not be compensated. In this case, the balance of an image having the positive hairline may be degraded by overcompensation. As a result, an image may be represented in high resolution.

Figure 7:
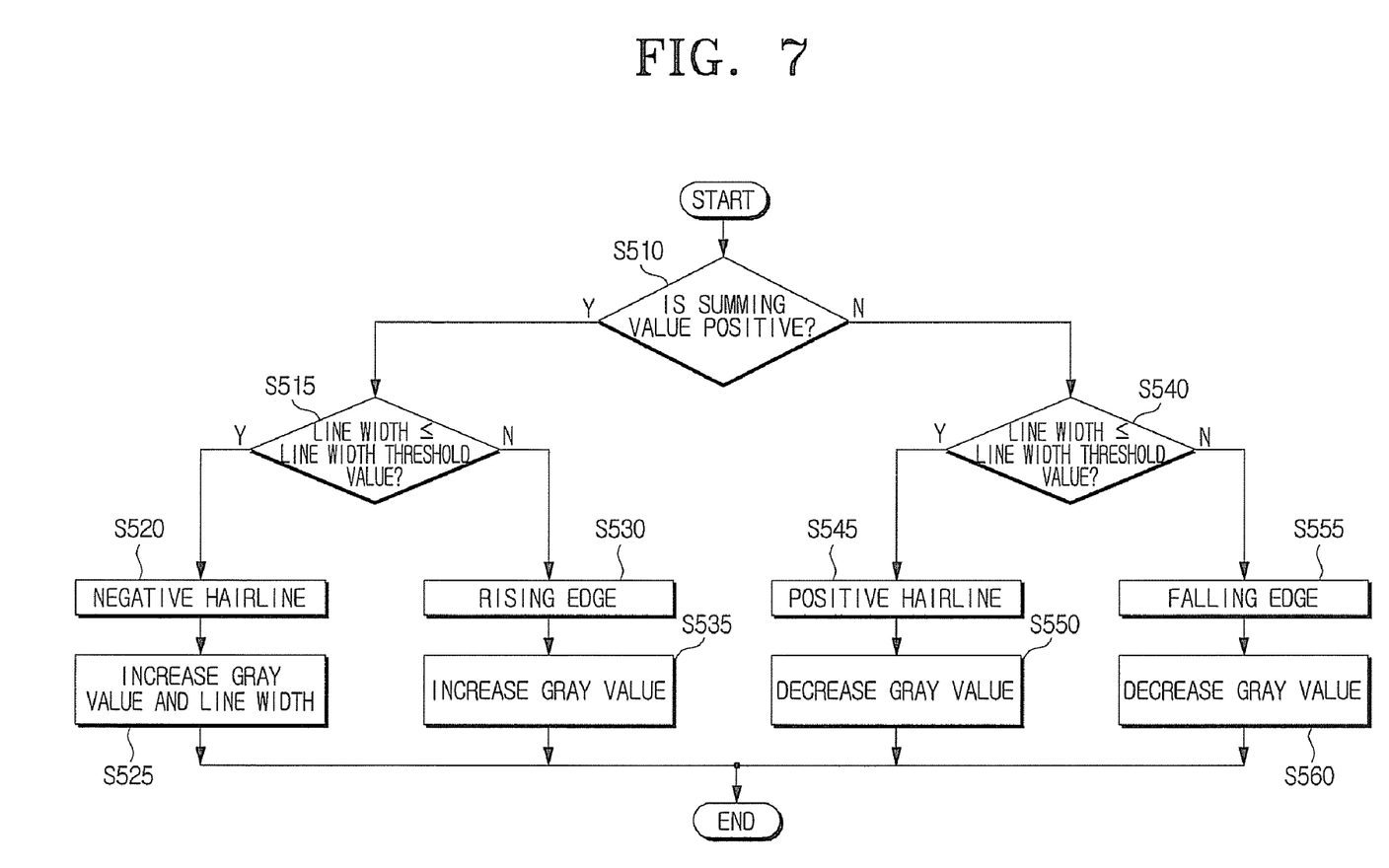
FIG. 7 is a flowchart illustrating an edge categorizing method and a compensating method, according to exemplary embodiments of the present invention

FIG. 7 is a flowchart illustrating an exemplary embodiment of the method of FIG. 6. Referring to FIG. 7, an edge of a gray scale image is detected, and a determination is made as to whether a sum of the differences of gray values of the detected edge is positive (S510:Y). If the sum is positive, a determination is made as to whether or not a line width of the edge is less than a predetermined line width threshold value (S515). If the line width of the edge is less than the predetermined line width threshold value (S515:Y), the edge is categorized as a negative hairline (S520). The gray value and line width of the negative hairline are then increased, by increasing the gray value of a pixel included in the hairline and the gray value of an adjacent pixel (S525).

If the line width of the edge is determined to exceed a predetermined line width threshold value (S515:N), the edge is categorized as a rising edge (S530). A gray value of the rising edge is then increased (S535).

If the sum of the differences in the gray values of the detected edge is negative (S510:N), whether or not a line width of the edge is less than the predetermined line width threshold value is determined (S540). If the line width of the edge is less than the predetermined line width threshold value (S540:Y), the edge is categorized as a positive hairline (S545). The gray value of the positive hairline, is increased, by increasing the gray value of a pixel included in the positive hairline (S550).

If a line width of the edge exceeds a predetermined line width threshold value (S545:N), the edge is categorized as a rising edge (S555). A gray value of the rising edge is then increased (S560).

An uneven outline of an image is sharpened and smoothed, such that an image may be represented in high resolution. Additionally, a hairline not represented due to a dot gain effect, may be clearly represented.

As described above, according to the exemplary embodiments of the present invention, resolution of an image is improved. An uneven outline of an image, for example text, is sharpened and smoothed, such that the resolution of the image is increased and the image can be represented in high resolution. Additionally, a hairline not represented due to dot gain effect may be clearly represented.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An image forming apparatus comprising:
   an image processing device to compensate at least one of a gray value and a line width of an edge, according to the edge type forming an input image,
   wherein the image processing device comprises a detection unit to detect an edge of an input image, a categorization unit to categorize the edge into an edge type, according to a gray value and a line width associated with the edge, and a compensation unit to compensate at least one of the gray value and the line width, according to the categorized edge type, and
   wherein the categorization unit categorizes the edges as rising edges or as falling edges, according to whether a sum of the differences of the gray values of the pixels of the detected edge is positive or negative, and categorizes the falling edges and the rising edges as positive hairlines or as negative hairlines, respectively, according to a comparison with a threshold value (TH_WIDTH) of a predetermined line width,
   wherein the image is formed of pixels, and the detection unit sequentially sets each of the pixels as a center pixel, and determines whether the center pixel is included in an edge, by comparing a sum of gray value differences between the center pixel and adjacent ones of the pixels with a predetermined gray threshold value,
   wherein if the sum is positive, the categorization unit categorizes the edge as a rising edge, and if the sum is negative, the categorization unit categorizes the edge as a falling edge, and
   wherein if the line width of the rising edge is less than a predetermined line width threshold value, the categorization unit cateqorizes the rising edge as a negative hairline, and if the line width of the falling edge is less than the predetermined line width threshold value, the categorization unit categorizes the falling edge as a positive hairline.

2. The apparatus according to claim 1, wherein the image comprises text and/or a hairline.

3. The apparatus according to claim 1, wherein:
   if the edge is a rising edge, the compensation unit increases a gray value of the rising edge;
   if the edge is a falling edge, the compensation unit decreases a gray value of the falling edge;
   if the edge is a positive hairline, the compensation unit decreases a gray value of the positive hairline; and
   if the edge is a negative hairline, the compensation unit increases a gray value and a line width of the negative hairline.

4. The apparatus according to claim 1, wherein the compensation unit compensates the edge based on a lookup table comprising gray value compensation amounts corresponding to the categorized edge type.

5. The apparatus according to claim 1, wherein the detection unit comprises a high-pass filter to filter an area of the image.

6. The apparatus according to claim 5, wherein the high-pass filter comprises a Canny filter or a Sobel filter.

7. The apparatus according to claim 1, wherein the detection unit comprises a high-pass filter to filter an area of the image, multiplies a weighting factor of the high-pass filter by the gray value differences, and adds the multiplied differences to produce the sum.

8. The apparatus according to claim 1, wherein the compensation unit increases a gray value of one of the pixels that is adjacent to one of the pixels associated with the negative hairline, to compensate the line width of the edge.

9. An image forming apparatus comprising:
an image processing device to compensate at least one of a gray value and a line width of an edge, according to the edge type forming an input image,
wherein the image processing device comprises a detection unit to detect an edge of an input image, a categorization unit to categorize the edge into an edge type, according to a gray value and a line width associated with the edge, and a compensation unit to compensate at least one of the gray value and the line width, according to the categorized edge type, and
wherein the categorization unit categorizes the edges as rising edges or as falling edges, according to whether a sum of the differences of the gray values of the pixels of the detected edge is positive or negative, and categorizes the falling edges and the rising edges as positive hairlines or as negative hairlines, respectively, according to a comparison with a threshold value (TH_WIDTH) of a predetermined line width, and
wherein the compensation unit increases a difference in gray values of adjacent ones of the pixels associated with the edge, to compensate the gray value of the edge.

10. A method of forming an image in a host device or image forming apparatus having a processor, the method comprising:
detecting an edge of an input image using the processor;
categorizing the edge into an edge type, according to a gray value and a line width of the edge using the processor; and
compensating at least one of the gray value and the line width of the edge according to the categorized edge type using the processor,
wherein the categorizing categorizes the edges as rising edges or as falling edges, according to whether a sum of the differences of the gray values of the pixels of the detected edge is positive or negative, and categorizing the falling edges and the rising edges as positive hairlines or as negative hairlines, respectively, according to a comparison with a threshold value (TH_WIDTH) of a predetermined line width,
wherein the image is formed of pixels, and the detecting of the edge comprises sequentially setting each of the pixels as a center pixel and comparing a sum of gray value differences between the center pixel and adjacent ones of the pixels with a predetermined gray threshold value,
wherein the categorizing of the edge comprises categorizing the edge as a rising edge, if the sum is positive and categorizing the edge as a falling edge, if the sum is negative, and
wherein the categorizing of the edge comprises categorizing the rising edge as a negative hairline, if the line width of the rising edge is less than a predetermined line width threshold value, and categorizing the falling edge as a positive hairline, if the line width of the falling edge is less than the predetermined line width threshold value.

11. The method according to claim 10, wherein the image comprises text and/or a hairline.

12. The method according to claim 10, wherein the compensating comprises:
if the edge is a rising edge, increasing a gray value of the rising edge;
if the edge is a falling edge, decreasing a gray value of the falling edge;
if the edge is a positive hairline, decreasing a gray value of the positive hairline; and
if the edge is a negative hairline, increasing a gray value and a line width of the negative hairline.

13. The method according to claim 10, wherein the compensating comprises compensating the gray value based on a lookup table comprising gray value compensation amounts corresponding to the categorized edge type.

14. The method according to claim 10, wherein the detecting comprises filtering an area of the image.

15. The method according to claim 10, wherein the compensating comprises increasing a gray value of one of the pixels that is adjacent to one of the pixels associated with the negative hairline, to compensate the line width of the edge.

16. The method according to claim 10, wherein the detecting further comprises multiplying a weighting factor of a high-pass filter by the gray value differences, and adding the multiplied differences to produce the sum.

17. A method of forming an image in a host device or image forming apparatus having a processor, the method comprising:
detecting an edge of an input image using the processor;
categorizing the edge into an edge type, according to a gray value and a line width of the edge using the processor; and
compensating at least one of the gray value and the line width of the edge according to the categorized edge type using the processor,
wherein the categorizing categorizes the edges as rising edges or as falling edges, according to whether a sum of the differences of the gray values of the pixels of the detected edge is positive or negative, and categorizing the falling edges and the rising edges as positive hairlines or as negative hairlines, respectively, according to a comparison with a threshold value (TH_WIDTH) of a predetermined line width, and
wherein the compensating comprises increasing a difference in gray values of adjacent ones of the pixels associated with the edge.

18. The method according to claim 15, wherein the compensating further comprises increases a difference in gray values of adjacent ones of the pixels associated with the negative hair line, to compensate the gray value of the edge.

* * * * *

UNITED STATES PATENT AND TRADEMARK OFFICE
CERTIFICATE OF CORRECTION

PATENT NO.         : 8,248,662 B2
APPLICATION NO.    : 11/942906
DATED              : August 21, 2012
INVENTOR(S)        : Hyeon-seok Seo It is certified that error appears in the above-identified patent and that said Letters Patent is hereby corrected as shown below:

Column 8, Line 42, In Claim 1, delete "cateqorizes" and insert -- categorizes --, therefor.
Column 10, Line 57, In Claim 18, delete "hair line," and insert -- hairline, --, therefor.

Signed and Sealed this
Twentieth Day of November, 2012

David J. Kappos
*Director of the United States Patent and Trademark Office*